(12) United States Patent
Sakakibara et al.

(10) Patent No.: US 7,327,500 B2
(45) Date of Patent: Feb. 5, 2008

(54) IMAGE INPUTTING APPARATUS

(75) Inventors: Jun Sakakibara, Tokyo (JP); Koji Tanimoto, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1036 days.

(21) Appl. No.: 10/391,623

(22) Filed: Mar. 20, 2003

(65) Prior Publication Data
US 2004/0184116 A1 Sep. 23, 2004

(51) Int. Cl.
*H04N 1/04* (2006.01)
(52) U.S. Cl. ............... 358/483; 358/474; 358/505; 358/501; 358/514; 382/252; 348/96; 348/296; 348/297; 348/324; 348/283; 348/280
(58) Field of Classification Search ........... 358/505, 358/514, 501, 474, 483; 382/252; 348/96, 348/296–297, 324, 283, 280, 311; 345/204, 345/63, 87; 250/208.1; 257/59, 291
See application file for complete search history.

(56) References Cited

U.S. PATENT DOCUMENTS

| | | | |
|---|---|---|---|
| 5,499,111 A | * | 3/1996 | Sato et al. .................. 382/252 |
| 5,946,427 A | * | 8/1999 | Kanemitsu ................... 382/312 |
| 2003/0053157 A1 | | 3/2003 | Sakakibara et al. |
| 2004/0240003 A1 | * | 12/2004 | Sakakibara ................. 358/505 |

FOREIGN PATENT DOCUMENTS

| | | | |
|---|---|---|---|
| JP | 11094696 A | * | 4/1999 |
| JP | 2000-244819 A | | 9/2000 |

* cited by examiner

*Primary Examiner*—Kimberly Williams
*Assistant Examiner*—Michael Burleson
(74) *Attorney, Agent, or Firm*—Foley & Lardner LLP

(57) ABSTRACT

All electric charges accumulated in a line sensor are transferred via a first shift gate to a first analog shift register. By controlling the width of a shift pulse signal to be supplied to a second shift gate, the amount of an electric charge transfer when the electric charges on the first analog shift register are transferred to a second shift register is controlled. As a result, the amount of the electric charges on the first analog shift register is controlled to a desired value. Accordingly, the amplitude of an image signal outputted from the first analog shift register can be easily adjusted. Further, the sensitivity of a CCD line sensor and variation of light amount of a light source can be corrected.

13 Claims, 13 Drawing Sheets

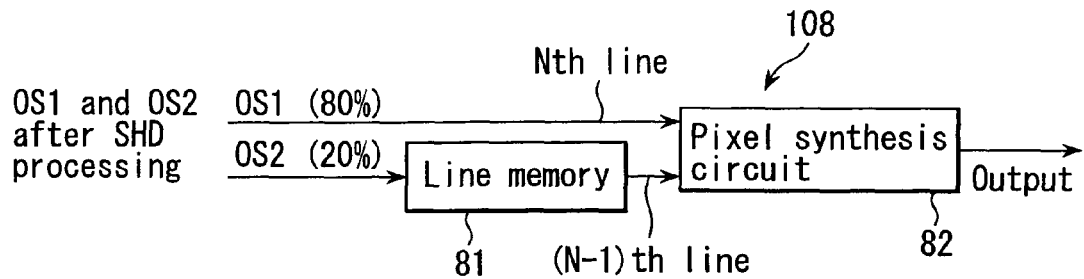
FIG. 7A
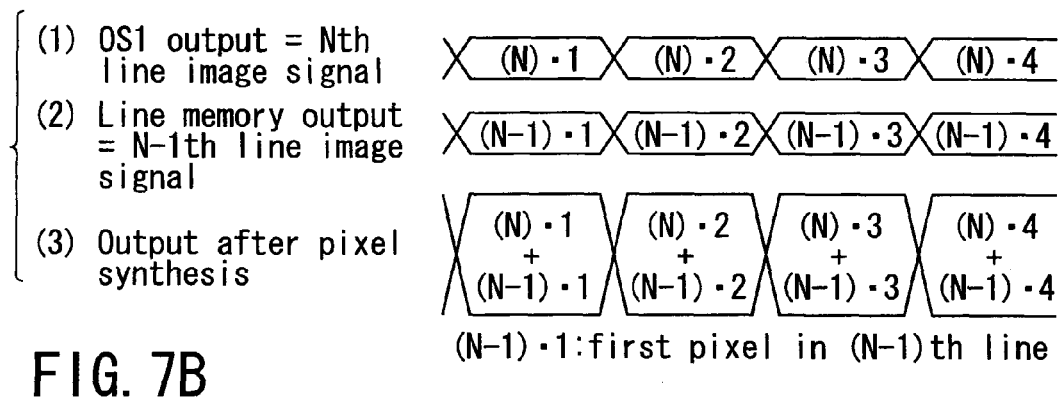
FIG. 7B  (N-1)·1: first pixel in (N-1)th line
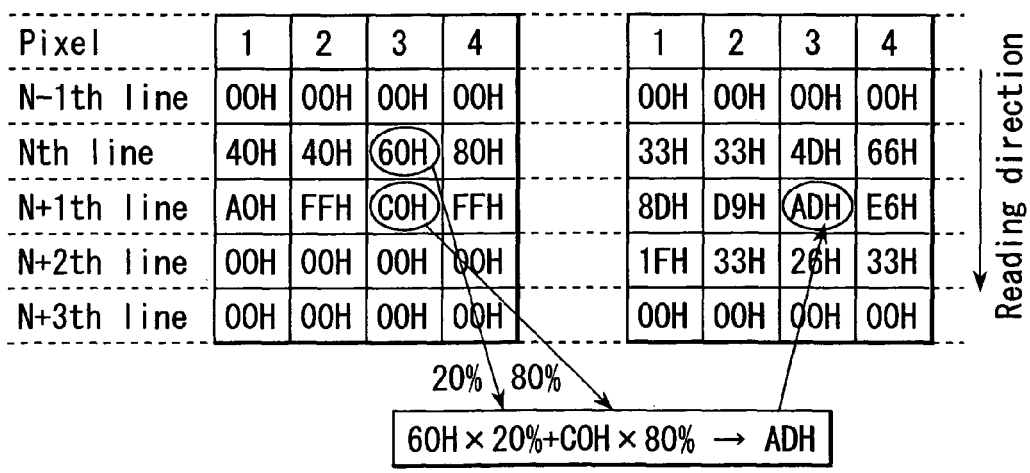
FIG. 7C  Resolution of pixel signal is 8bit (00H to FFH)

IMAGE INPUTTING APPARATUS

BACKGROUND OF THE INVENTION

The present invention relates to an image inputting apparatus, such as a scanner or a digital copying machine, that reads document image information by scanning a document with a CCD line sensor.

Conventionally, a CCD line sensor used for a reduction optical system is configured by a photodiode array in which photodiodes serving as photoelectric conversion elements are arranged in a line, an analog shift register, a shift gate for transferring electric charges generated by the photodiode array to the analog shift register, a floating capacitor for converting the electric charges shifted in a main-scanning direction by the analog shift register into voltage signals, and an output amplifier for amplifying the voltage signals.

The sensitivity of a CCD line sensor which is defined as an output voltage with respect to an incident light amount per unit time varies because of sensitivity variation of a photodiode array and amplification factor variation of the output amplifier. Generally, variations of around ±20% of a reference value are set as the specification.

In the case of a 3-line color CCD sensor for reading a color document, color filters of three primary colors, namely, RED, GREEN and BLUE are placed on light receiving surfaces of three photodiode arrays disposed in parallel. Variation of transmittance of the color filters is superposed on the sensitivity variation. Thus, the sensitivity variation of the 3-line color CCD sensor is usually ±30%.

A cold cathode tube using a phosphor or a xenon lamp has been used as a light source in a scanner or a digital copying machine serving as an image inputting apparatus. The light emission amount of the light source is generally known to vary because of luminous efficiency variation due to variation of coated amount of a phosphor and degradation of the luminous efficiency of the phosphor over time.

As described above, performances of main parts of the image inputting apparatus vary widely. In order to suppress such variations, a number of control adjustments, and high precision assembly, are required.

As an example of control, light control is performed in order to control the light amount of a light source so that an output voltage from a CCD line sensor is constant. Generally, however, the higher the output a light source using phosphor is, the shorter its product life is. Further, such light sources have characteristics influenced greatly by ambient temperature. Accordingly, it is important to balance the life of a phosphor light source with the product life cycle of an image inputting apparatus as a system.

In accordance with the above-described method, it is considered that the signal to noise (S/N ratio) component included in an output signal from a CCD line sensor is not improved by the above-described control, but maintained. Consequently, methods for fundamentally suppressing sensitivity variation of a CCD line sensor and light amount variation of a light source have not been forthcoming.

BRIEF SUMMARY OF THE INVENTION

An object of the present invention is to fundamentally suppress sensitivity variation of a CCD line sensor and light amount variation of a light source.

A CCD line sensor converts an optical signal into an amount of electric charges corresponding to the energy of the optical signal at its photodiode array section and accumulates the electric charges. The electric charges are moved via a shift gate to an analog shift register by a shift pulse signal (SH signal) inputted from outside. The electric charges transferred to the analog shift register are successively shifted by two types of externally-input transfer clock signals ($\phi1$, $\phi2$), which have phases different from each other by 180° so as to be converted into a voltage at the floating capacitor section provided subsequent to the analog shift register. Further, an image signal is outputted via a final stage output amplifier to outside as an analog voltage signal. The amount of electric charges accumulated in the photodiode array increases in proportion to an incident light amount and an accumulated time. The accumulated time corresponds to the cycle of a shift pulse signal.

The CCD line sensor has characteristics in which the amount of electric charges transferred from the photodiode array to the analog shift register varies depending on the drive time (pulse width) of the shift pulse signal.

When a CCD line sensor is actually used as an image reading apparatus, the cycle of a shift pulse signal is set in accordance with a system to be used. The pulse width of the shift pulse signal is set to be a time duration which is sufficient for all electric charges accumulated in a photodiode array to be moved to an analog shift register. If this time is not sufficient and thus all electric charges are not transferred to the analog shift register, so that electric charges remain in the photodiode array section, the image signal of a previous line is superposed on the image signal of a desired read line. As a result, a drawback occurs, namely, a residual image is generated.

Basically, when driving a CCD line sensor, all electric charges accumulated in a photodiode array must be transferred. Thus, if the sensitivity of the CCD line sensor and the light amount of a light source vary, the amplitude of an output signal may accordingly.

In accordance with an embodiment of the present invention, two shift gates and two analog shift registers are provided on an electric charge transfer path from a photodiode array to the analog shift register.

Specifically, all electric charges accumulated in a photodiode are transferred via a first shift gate adjacent to the photodiode array to a first analog shift register. In this state, the electric charges on the first analog shift register contain variations of sensitivity of the CCD line sensor (photodiode array) and variations of light amount of a light source.

A second shift gate and a second analog shift register are disposed adjacent to the first analog shift register. By controlling the effective signal time (drive pulse width) of the second shift gate, an electric charge transfer amount when electric charges on the first analog shift register are transferred to the second shift register can be controlled. As a result, the amplitude of a signal voltage on the first analog shift register is controlled to a desired value. Because electric charges on the second analog shift register are not required, the electric charges are successively outputted by the transfer clocks.

By the operation described above, the amplitude of a signal outputted from the first analog shift register can be easily adjusted, and the variation of sensitivity of the CCD line sensor and the variation of light amount of the light source can be corrected.

In the case of a CCD sensor in which filters of three primary colors, namely, RED, GREEN and BLUE are placed on light receiving surfaces of photodiode arrays such as a 3-line CCD sensor, when a white document serving as a reference is read, amplitudes of the respective color output signals may not coincide because of the spectral characteristics of the light source and the spectral sensitivity of the CCD line sensor including transmittances of the color filters. In such a state, two shift registers and two analog shift registers are provided for each of the respective color photodiode arrays. By controlling the pulse width of a drive signal in the second shift gate, the amplitudes of the respective color signals can coincide with each other.

Further, there is provided a light source switching color image inputting apparatus which has a light source with RED spectral characteristics, a light source with GREEN spectral characteristics and a light source with BLUE spectral characteristics and which reads a color image by switching these three light sources. A photodiode array, three shift gates and three analog shift registers are provided in this image inputting apparatus. The analog shift registers are allocated to the respective colors. While a shift pulse is generated in the first shift gate, the three light sources are on-off controlled, so that signals corresponding to RED, GREEN and BLUE can be simultaneously outputted.

BRIEF DESCRIPTION OF THE DRAWINGS

FIG. 7A is a schematic structural view of a signal processing circuit using the CCD line sensor 6;

FIG. 7B is a signal timing chart of the signal processing circuit using the CCD line sensor 6;

FIG. 7C is a view for explaining an example of image using the CCD line sensor 6;

DETAILED DESCRIPTION OF THE INVENTION

Figure 1:
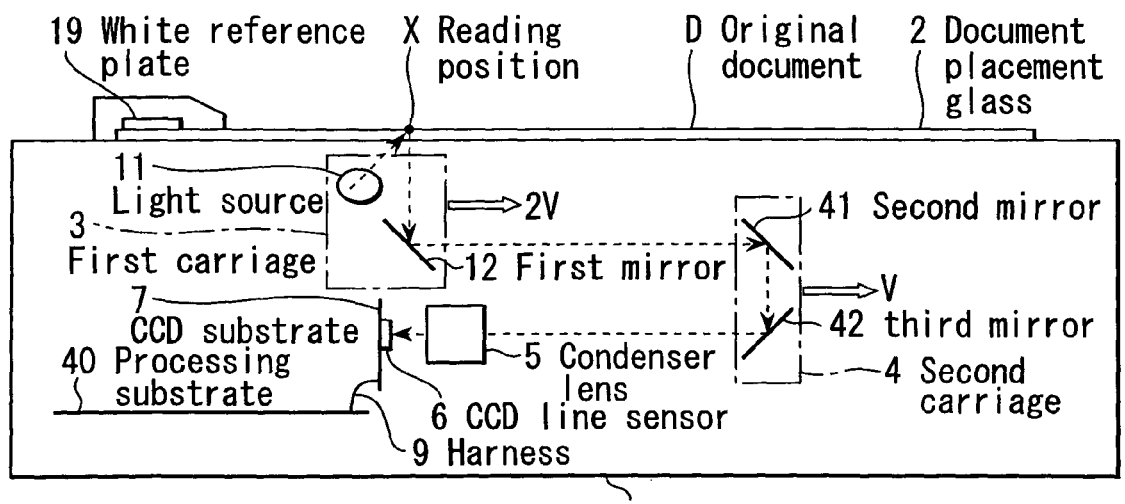
FIG. 1 is a schematic structural view of an image inputting apparatus to which the present invention is applied.

Embodiments of the present invention will be described hereinafter referring to the drawings.

FIG. 1 shows the structure of an image inputting apparatus 1 using a CCD line sensor 6 relating to the present invention. The image inputting apparatus 1 is an apparatus for reading image information of a document at scanning line intervals based on resolutions.

A document D is placed on a document placement glass 2 with its image surface being faced downward. When a start button (not shown) is pushed, a light source 11 using a xenon light source or a cold cathode tube is lit. The irradiation light from the light source is transmitted through the document placement glass 2 and irradiated onto the reading position X on the document D. The reflected light from the reading position X on the document D is reflected by a first mirror 12. The reflected light from the first mirror 12 is irradiated onto a second mirror 41 and then a third mirror 42. The reflected light from the second mirror 41 and the third mirror 42 enters a condenser lens 5 and then is imaged onto the light receiving surface of the CCD line sensor 6. The CCD line sensor 6 scans the document D in a main-scanning direction. In addition to the CCD line sensor 6, a CCD driver for driving the CCD line sensor 6 is mounted on a CCD substrate 7. An electric circuit for processing an image signal outputted from the CCD line sensor 6 and a processing circuit for overall control of the image inputting apparatus 1 such as a CPU (a scanner control section 40 to be described later) are mounted on a processing substrate 8. The CCD substrate 7 is connected to the processing substrate (scanner control section) 8 by a harness 9.

In the case of reading the document D, a first carriage 3 formed of the light source 11 and the first mirror 12 and a second carriage 4 formed of the second mirror 41 and the third mirror 42 are moved in the directions indicated by the arrows in the figure by an unillustrated drive system formed of a drive motor and a belt or wire. Thus, the reading position X is moved from the left to the right in the figure, so that the document D is scanned in a sub-scanning direction. If the movement speed of the first carriage 3 is 2V, the movement speed of the second carriage 4 is V. Namely, the movement speed of the first carriage 3 is twice as fast as that of the second carriage 4.

Figure 2:
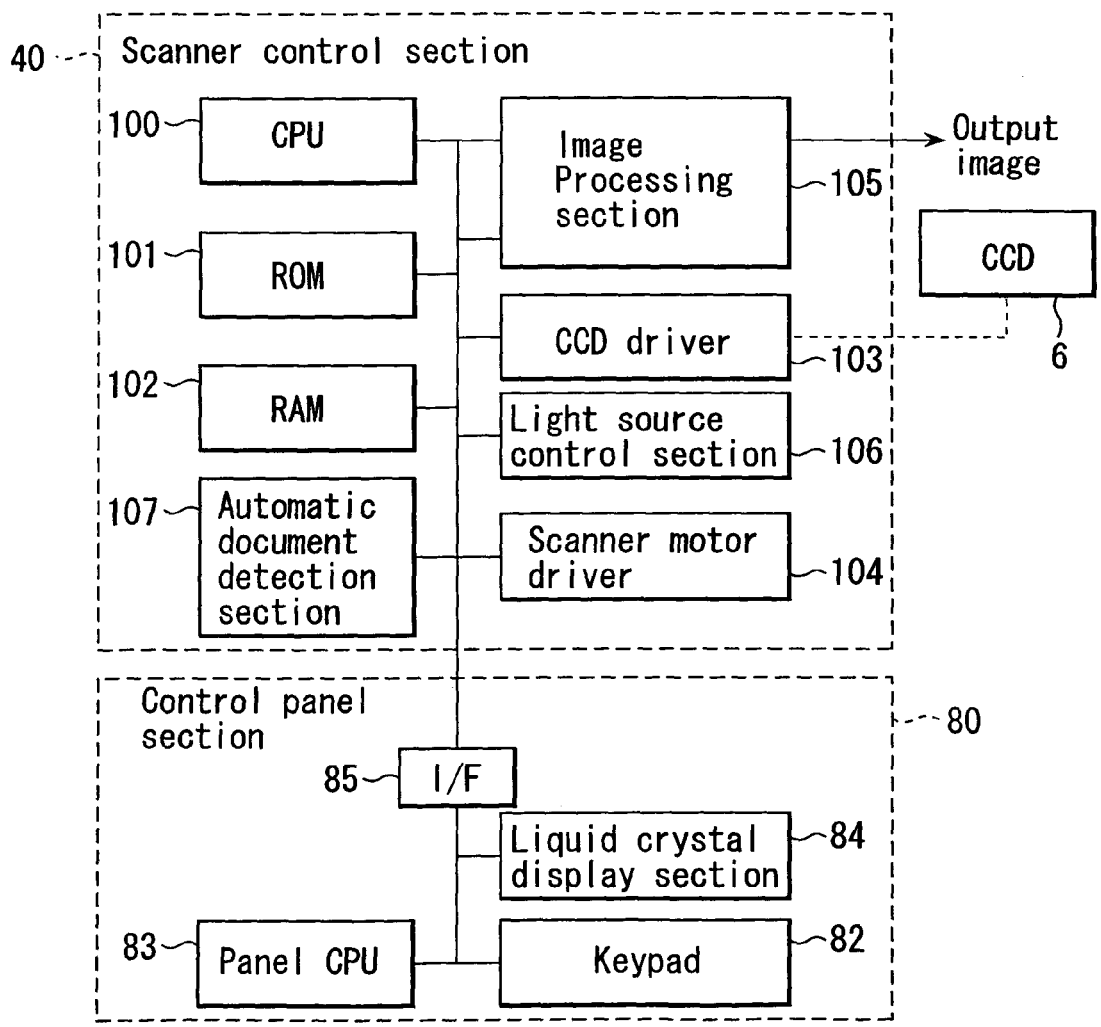
FIG. 2 is a block diagram for illustrating the structure of control system of the image inputting apparatus shown in FIG. 1.

FIG. 2 is a block diagram for illustrating the structure of a control system for the image inputting apparatus 1. The image inputting apparatus 1 includes the scanner control section 40 and a control panel section 80.

The scanner control section 40 includes a CPU 100, a ROM 101, a RAM 102, a CCD driver 103, a scanner motor driver 104, an image processing section 105, a light source control section 106 for controlling the light source 12 and an automatic document detection section 107.

The CPU 100 controls the scanner control section 40 as a whole in accordance with a control program stored in the ROM 101, and uses the RAM 102 for temporarily storing data. The CCD driver 103 sends various types of CCD control signals to the CCD line sensor 6 so as to drive the same. The scanner motor driver 104 controls the rotation of the drive motor for moving the first carriage 3 and the second carriage 4. The automatic document detection section 107 automatically determines whether a document placed on the document placement glass 2 is a color document or a monochrome document, and a document size.

The image processing section 105 includes an A/D conversion circuit for converting an analog signal from the CCD line sensor 6 into a digital signal, a shading compensation circuit for correcting variation of a threshold level with respect to output signals from the CCD line sensor 6 caused by variation of ambient temperature, and a gamma correction circuit. Further, the image processing section 105 also includes a line memory for temporarily storing corrected digital signals from these correction circuits. The image processing section 105 performs image processings including a trimming, a masking, an enlargement/reduction processing, a resolution conversion and an image compression/decompression processing with respect to corrected image data.

The control panel section 80 includes a keypad 82, a panel CPU 83, a liquid crystal display section 84 and a control panel I/F 85. The panel CPU 83 communicates with the CPU 100 via the control panel I/F 85. A screen for setting document reading conditions is displayed on the liquid crystal display section 84. The panel CPU 83 receives data about document reading conditions inputted by a user through the keypad 82, transfers the key input data to the scanner control section 40 and displays the data on the liquid crystal display section 84. The document reading conditions include information about whether a document is to be read as a color document or a monochrome document and resolution information.

Certain embodiments of the present invention will be described hereinafter. Image inputting apparatuses in the respective embodiments have the same basic structure as that shown in FIGS. 1 and 2.

Next, an output signal from the CCD line sensor 6 will be described.

The waveform of output signal of the CCD line sensor 6 appears as voltage values that are in proportionate to an incident light amount in a direction from a predetermined offset voltage to 0V serving as a reference voltage.

A photoelectric conversion section of the CCD line sensor 6 is formed of a photodiode array and photodiodes have nonuniform photoelectric conversion efficiencies. Such nonuniformity is defined as output voltage nonuniformity in the CCD line sensor 6 and considered as a high frequency distortion of an output signal from the CCD line sensor 6. Further, because the condenser lens 5 is used in the reduction optical system shown in FIG. 1, a lens aberration occurs. Because of such aberration, light receiving amounts of both ends of the light receiving surface of the CCD line sensor 6 are reduced as compared to that of the central portion of the light receiving surface. This is referred to as a low frequency distortion in contrast to the high frequency distortion.

A processing circuit provided subsequent to the CCD line sensor 6 must correct the offset voltage, a high frequency distortion and a low frequency distortion. The offset voltage in a CCD level is removed by serially connecting a capacitor subsequent to the CCD line sensor 6. Further, the offset voltage is fixed to a desired voltage by setting the potential of the capacitor. Alternatively, the potential of signal in the case that light is not irradiated onto the CCD line sensor 6 may be considered as the reference potential for a black level. Then, this potential signal may be set as a desired voltage with the offset voltage removed.

An output analog signal from each pixel is subjected to a sample hold processing, so that its amplitude is stabilized. The amplitude of the sampled analog signal is amplified into an amplitude corresponding to the input range of a subsequent analog-digital converter (referred to as ADC hereinafter) by a gain amplifier generally referred to as a programmable gain amplifier (PGA). The signal subjected to the amplitude adjustment is converted into a digital signal with a resolution corresponding to a system by the ADC. The analog signal inputted to the ADC must not exceed the input range of the ADC. Thus, the amplification factor of the PGA is adjusted with an image signal obtained when a white reference plate 19 shown in FIG. 1 is read being a maximum input value. Because the white in the white reference plate 19 is set to have higher reflectance than that of white documents, as a result of the adjustment, no matter what type of document is read, the output of the ADC is not saturated.

In this state, the signal certainly includes the high frequency distortion and the low frequency distortion. Accordingly, for the purpose of correcting such distortions, a distortion correction (which is generally called a shading correction and simply referred to as SHD correction hereinafter) is required.

In accordance with a specific method for the correction, the light source 11 is switched off. Then, a pixel signal which is converted into a digital signal by the ADC is stored as a black reference signal while light is not irradiated onto the CCD line sensor 6. The light source 11 is then lit and a pixel signal obtained by reading the white reference plate 19 is converted into a digital signal by the ADC, and the resultant digital signal is stored as a white reference signal. Generally, in order to remove noise, a plurality of, e.g., 8 or 16 lines of signals are read and the average value of the signals is utilized for the black and white reference signals.

The black reference signal is subtracted from an image signal for the read document D on a pixel-by-pixel basis and a coefficient is multiplied by this image signal. The coefficient is determined so that the white reference signal obtains a desired value (e.g., 255 in the case of 8 bit resolution). By this processing, the high and low frequency distortion-corrected image signal (SHD-corrected) can be obtained. Described above is the basic operation of the image inputting apparatus.

The present invention will be described referring to FIGS. 3A, 3B, 4, 5A and 5B.

Figure 3A:
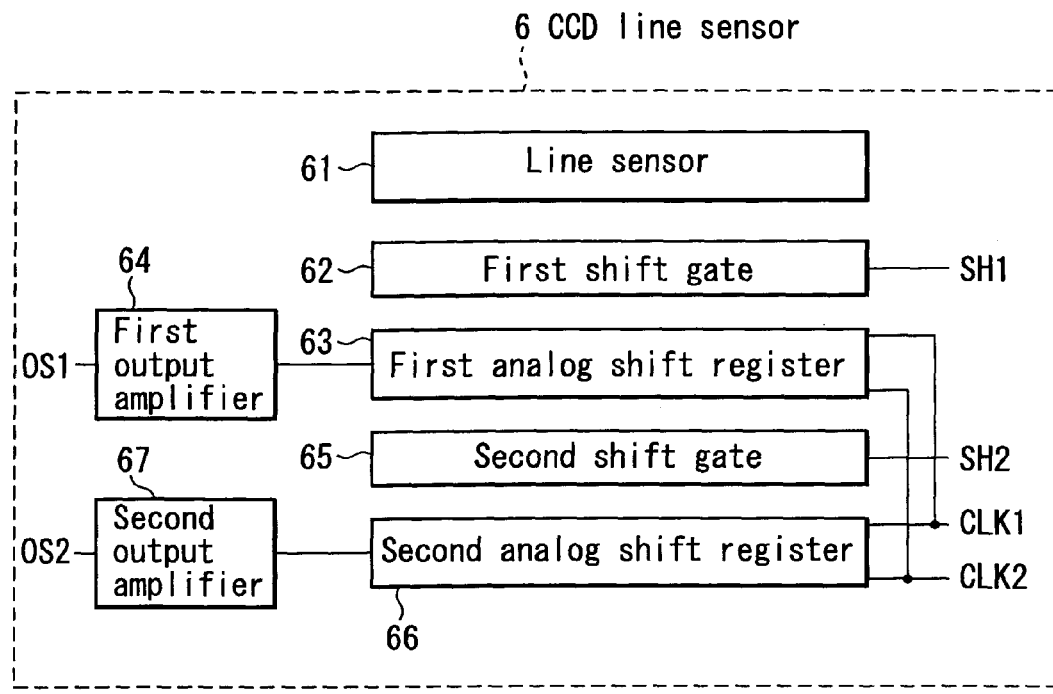
FIG. 3A is a schematic structural view of a CCD line sensor 6 relating to a first embodiment of the present invention.
Figure 4:
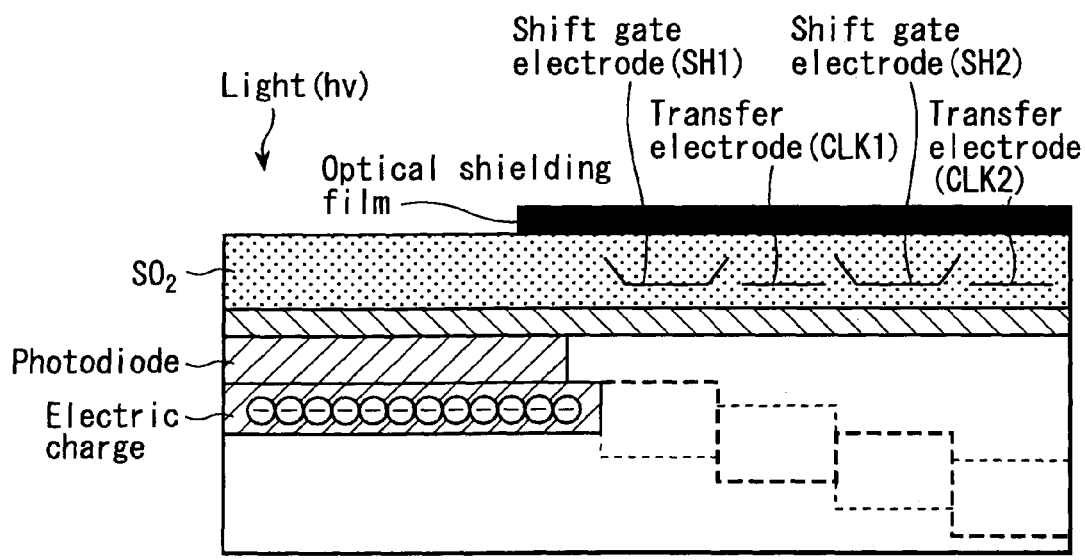
FIG. 4 illustrates the internal structure of the CCD line sensor 6 shown in FIG. 3A.
Figure 3B:
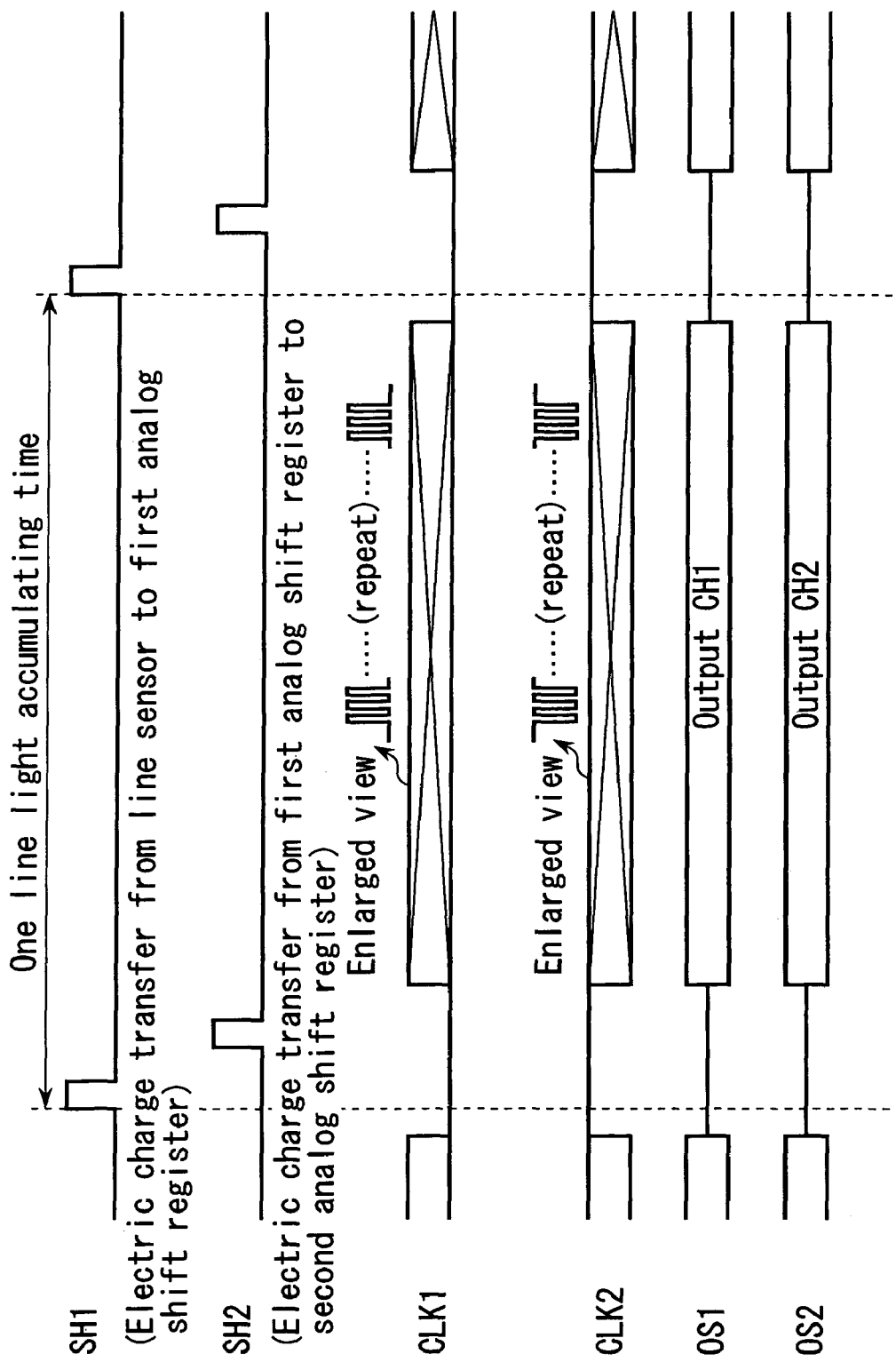
FIG. 3B is an operational timing chart of the CCD line sensor 6 relating to the first embodiment of the present invention.
Figure 5A:
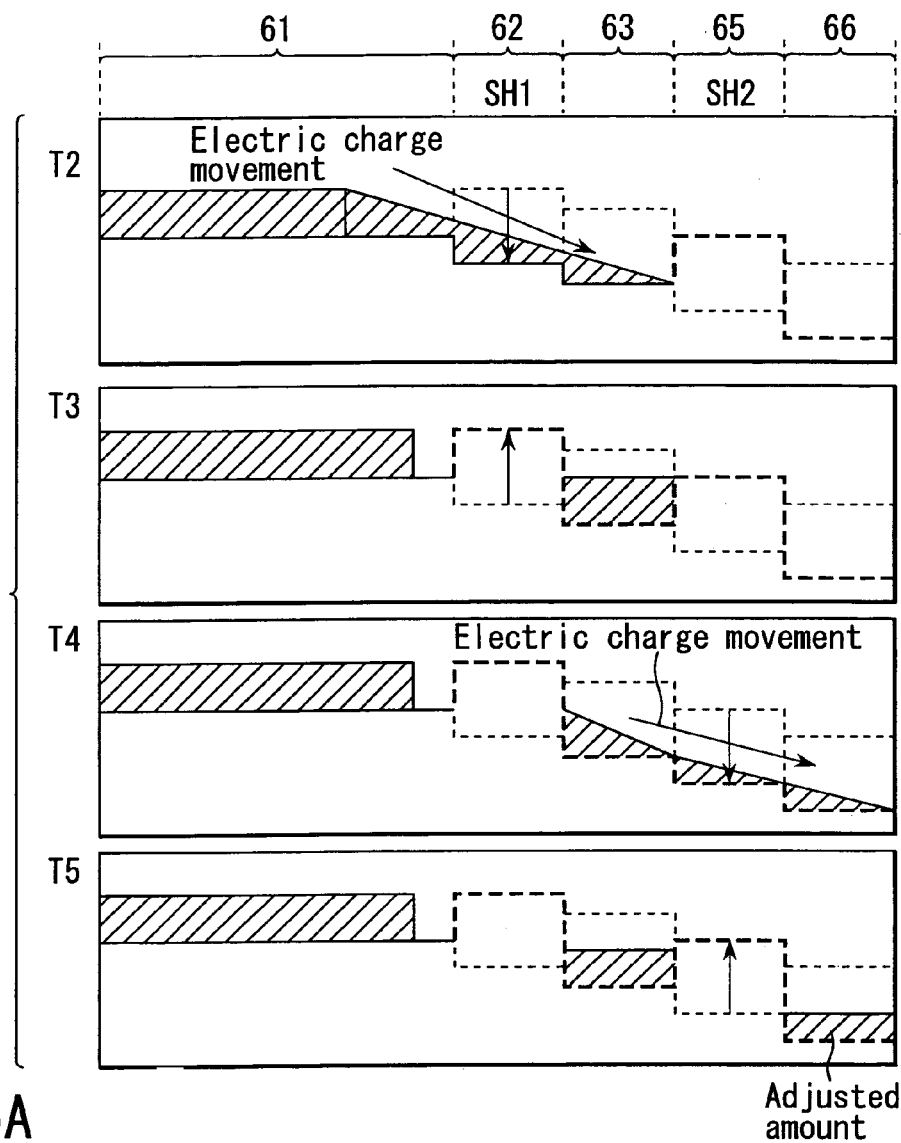
FIG. 5A is a chart for illustrating the internal operation of the CCD line sensor 6 shown in FIG. 4.
Figure 5B:
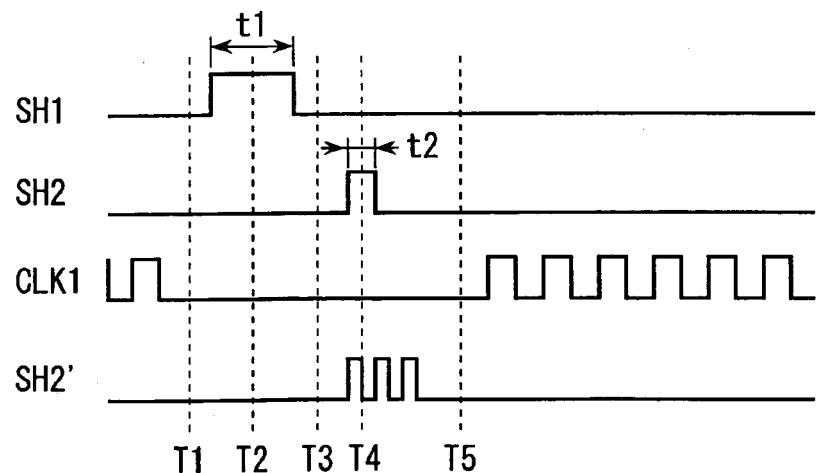
FIG. 5B is an operational timing chart of the CCD line sensor 6 shown in FIG. 4.

FIG. 3A is a schematic structural view of the CCD line sensor 6 relating to a first embodiment of the present invention. FIG. 3B is a chart for explaining timing. FIG. 4 illustrates the internal structure of the CCD line sensor 6. FIG. 5A is an explanatory view of the internal operation of the CCD line sensor 6. FIG. 5B illustrates an example of the timing. FIG. 4 illustrates the structure of one photodiode which receives light. The CCD line sensor 6 is formed by linearly arranging a plurality of photodiodes.

The CCD line sensor 6 is configured by a line sensor 61, a first shift gate 62, a first analog shift register 63, a first output amplifier 64, a second shift gate 65, a second analog shift register 66 and a second output amplifier 67. The line sensor 61 is formed of a photodiode array. The first shift gate 62 simultaneously transfers electric charges obtained by the photoelectric conversion functions of photodiodes in the line sensor 61. The first analog shift register 63 shifts the electric charges transferred via the first shift gate in a main-scanning direction depending on shift clocks CLK1 and CLK2 to provide shifted image signals. The first output amplifier 64 amplifies the shifted image signals from the first analog shift register 63 and successively provides the resultant amplified signals to outside. The second shift gate 65 simultaneously transfers the electric charges transferred to the first analog shift register 63. The second analog shift register 66 shifts the electric charges transferred via the second shift gate in the main-scanning direction depending on the shift clocks CLK1 and CLK 2 to provide shifted image signals. The second output amplifier 67 amplifies the shifted output signals from the second analog shift register 66 and successively provides the resultant amplified signals to outside.

An optical energy (hv) is irradiated onto the line sensor 61. The optical energy is made into an electric charge by the photoelectric conversion function. The electric charge is accumulated in the line sensor 61. A drive signal SH1 applied to the first shift gate 62 is in an "L" level, and the gate remains ascended (the state of T1 in FIG. 5B).

When the level of the signal SH1 becomes "H", the first shift gate 62 is descended. The electric charge in the line sensor 61 is passed through the first shift gate 62 so as to be transferred to the first analog shift register 63 (the state of T2 in FIGS. 5A and 5B). By making the signal SH1 in the "H" level for a sufficiently long time (t1), all electric charges in the line sensor 61 are transferred to the first analog shift register 63. Then, the level of the signal SH1 is switched to "L" (the state of T3).

When the level of a signal SH2 is switched from an "L" level to a "H" level, the second shift gate 65 is descended. The electric charge transferred to the first analog shift register 63 is passed through the second shift gate 65 and transferred to the second analog shift register 66 (the state of T4). After a time (t2) during which a desired amount of electric charges remain passes, the level of the signal SH2 is returned to the "L" level (the state of T5).

As described above, the amount of electric charges in the first analog shift register 63 can be easily adjusted by adjusting the electric charge transfer time (the pulse width of the shift pulse signal SH2) in the second shift gate 62. The signals SH1 and SH2 are generated by the CCD control section 103. By the CCD control section 103 controlling the pulse width of the signal SH2, a light amount variation in the light source 11 and a sensitivity variation in the line sensor 61 (photodiode array) can be corrected. Such correction may be performed either by changing the "H" level time duration t2 of the signal SH2 as described above or by controlling the number of small pulses as SH2'.

Figure 6:
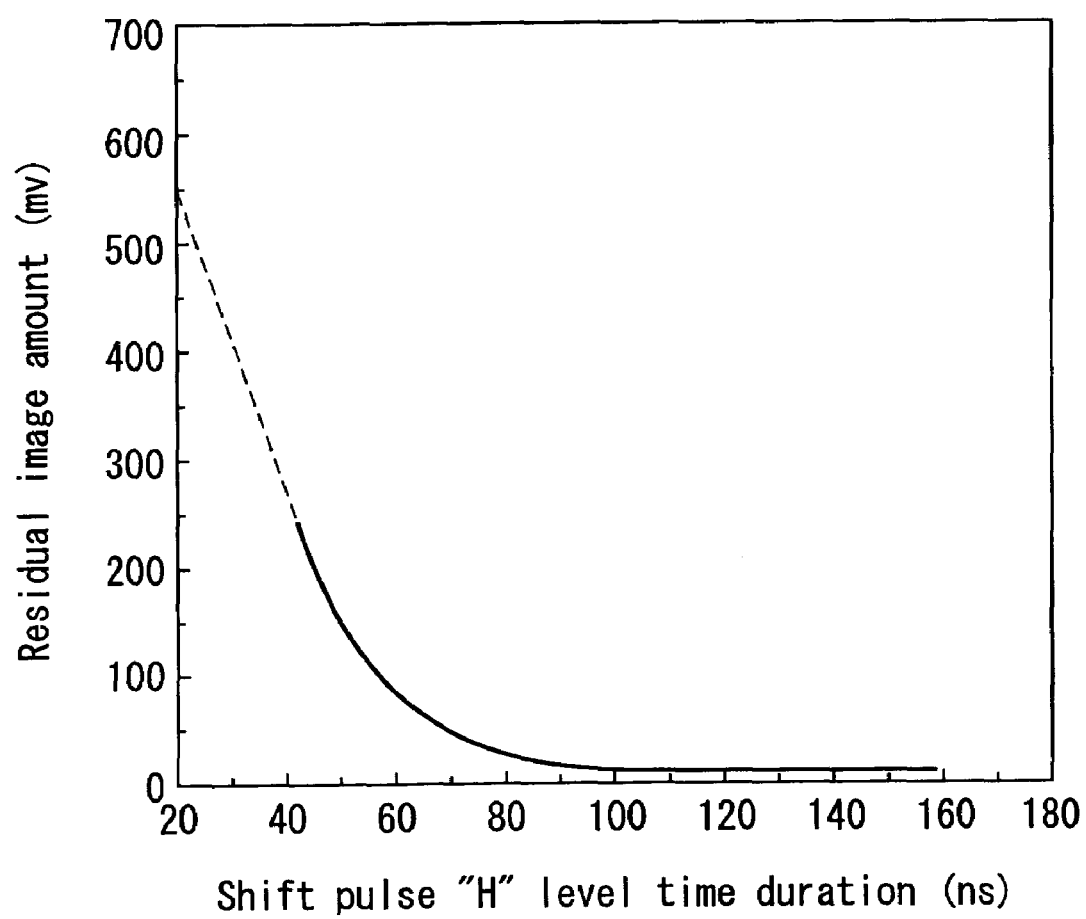
FIG. 6 is a graph for illustrating an example of the relationship between a shift gate pulse time duration and an electric charge transfer amount, relating to the principal of the present invention.

FIG. 6 illustrates an example of the relationship between the "H" level time duration for a shift pulse signal and a residual image amount.

The horizontal axis indicates the effective time duration of a shift gate drive signal (the "H" level time duration, namely, pulse width of the signal SH2 in the above description). The vertical axis indicates a residual image amount of electric charges in an analog shift register (residual amount of electric charges in the first analog shift register 63 in the above description). As seen from FIG. 6, the amount of electric charges transferred can be easily controlled by controlling the pulse width of a shift pulse signal to be applied to a shift gate. Referring to FIG. 6, the output level of photodiodes prior to an "H" level shift pulse being applied to a shift gate (in the case that the signal SH is in the "H" level time duration: 0 nS) is 800 mV.

Returning to FIGS. 3A and 3B, timings for the CCD line sensor 6 will be described.

A drive signal of the CCD line sensor 6 includes a shift pulse signal SH1 applied to the first shift gate 62 in order to transfer electric charges in the line sensor 61 to the first analog shift register 63, a shift pulse signal SH2 applied to the second shift gate 65 in order to transfer the electric charges in the first analog shift register 63 to the second analog shift register 66 and transfer clocks CLK1 ($\phi$1) and CLK2 ($\phi$2) for successively transferring the electric charges transferred to the first analog shift register 63 or the second analog shift register 66 to the first output amplifier 64 or the second output amplifier 67. The transfer clocks CLK1 ($\phi$1) and CLK2 ($\phi$2) are applied to both of the first analog shift register 63 and the second analog shift register 66.

While electric charges are passed through the first shift gate 62 or the second shift gate 65 and transferred to the first analog shift register 62 or the second analog shift register 66, if either analog shift register is operated, electric charges on the line sensor 61 are distributed to a plurality of pixel portions of the analog shift register. Accordingly, when the signal SH1 or SH2 is in the "H" level, the transfer clocks CLK1 and CLK2 must be stopped.

FIGS. 7A through 7C illustrate another embodiment. This embodiment is a gradation processing circuit 108 which improves a degree of gradation of an image with gradation such as a photographic image by using the CCD line sensor 6. FIG. 7A illustrates the schematic structure of the gradation processing circuit 108. The gradation processing circuit 108 is formed of a line memory 81 and a pixel synthesis circuit 82.

An analog signal OS1 outputted from the first output amplifier 64 shown in FIG. 3A is subjected to various types of analog-related processings including the offset removal and a sample hold and the like by the image processing section 105, converted into a digital signal by the ADC and normalized by the SHD correction. Thereafter, the resultant signal is inputted to the pixel synthesis circuit 82.

An analog signal OS2 outputted from the second output amplifier 67 shown in FIG. 3A is also subjected to various types of analog-related processings including the offset removal and the sample hold and the like, converted into a digital signal by the ADC and normalized by the SHD correction. Thereafter, the resultant signal is delayed by one line by the line memory 81 with respect to the flow of the image signal OS1 outputted from the first output amplifier 64.

As shown in FIG. 7B, the pixel synthesis circuit 82 adds an inputted image signal on a pixel-by-pixel basis. In this figure, for example "(N−1)·1" refers to the first pixel in the (N−1)th line. As described above, an image signal outputted from the line memory 81 is delayed by one line. The pixel synthesis circuit 82 adds the Nth line image signal from the first output amplifier 64 to the (n−1)th line image signal outputted from the line memory 81. By such processing, an image signal in which pixels in a reading direction (sub-scanning direction) are averaged can be easily generated. Namely, a degree of gradation of an image such a photographic image can be improved.

FIG. 7C illustrates the case in which 80% of electric charges of a read image signal are transferred to the first analog shift register 63 and 20% of electric charges are transferred to the second analog shift register 66 by controlling the pulse width of a drive signal SH2 in the second shift gate 65.

Assume that when reading is performed by a conventional CCD line sensor, an image signal at the third pixel in the Nth line is indicated by "60H", and an image signal at the third pixel in the N+1th line is indicated by "C0H". By using the present invention, the image signal at the third pixel in the N+1th line becomes "ADH" (60H×20%+C0H×80%=ADH). As a result, an averaging processing can be easily performed upon pixels.

In accordance with the above description, the ratio of the Nth line to the N+1th line is 20:80. Nevertheless, this ratio can be easily changed by controlling the "H" level of the signal SH2 to be applied to the second shift gate 65.

Next, another embodiment will be described referring to FIGS. 8A and 8B.

In this embodiment, there is provided a light source switching color image inputting apparatus which reads a color document with the CCD line sensor 6 for monochrome by switching emission colors of the light source 11.

The image inputting apparatus is almost the same as that of FIG. 1 except that the light source 11 is configured by three light sources, namely, a light source 11R with RED spectral characteristics, a light source 11G with GREEN spectral characteristics and a light source 11B with BLUE spectral characteristics.

Figure 8A:
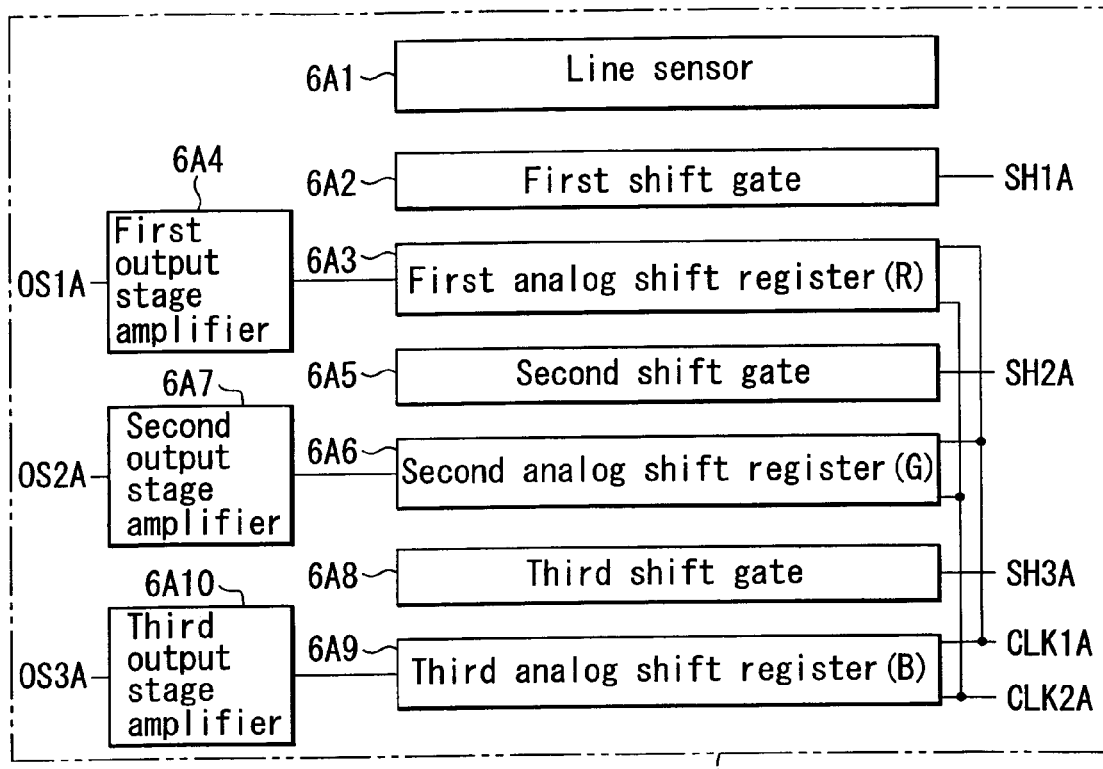
FIG. 8A is a schematic structural view of a CCD line sensor 6 relating to another embodiment of the present invention.
Figure 8B:
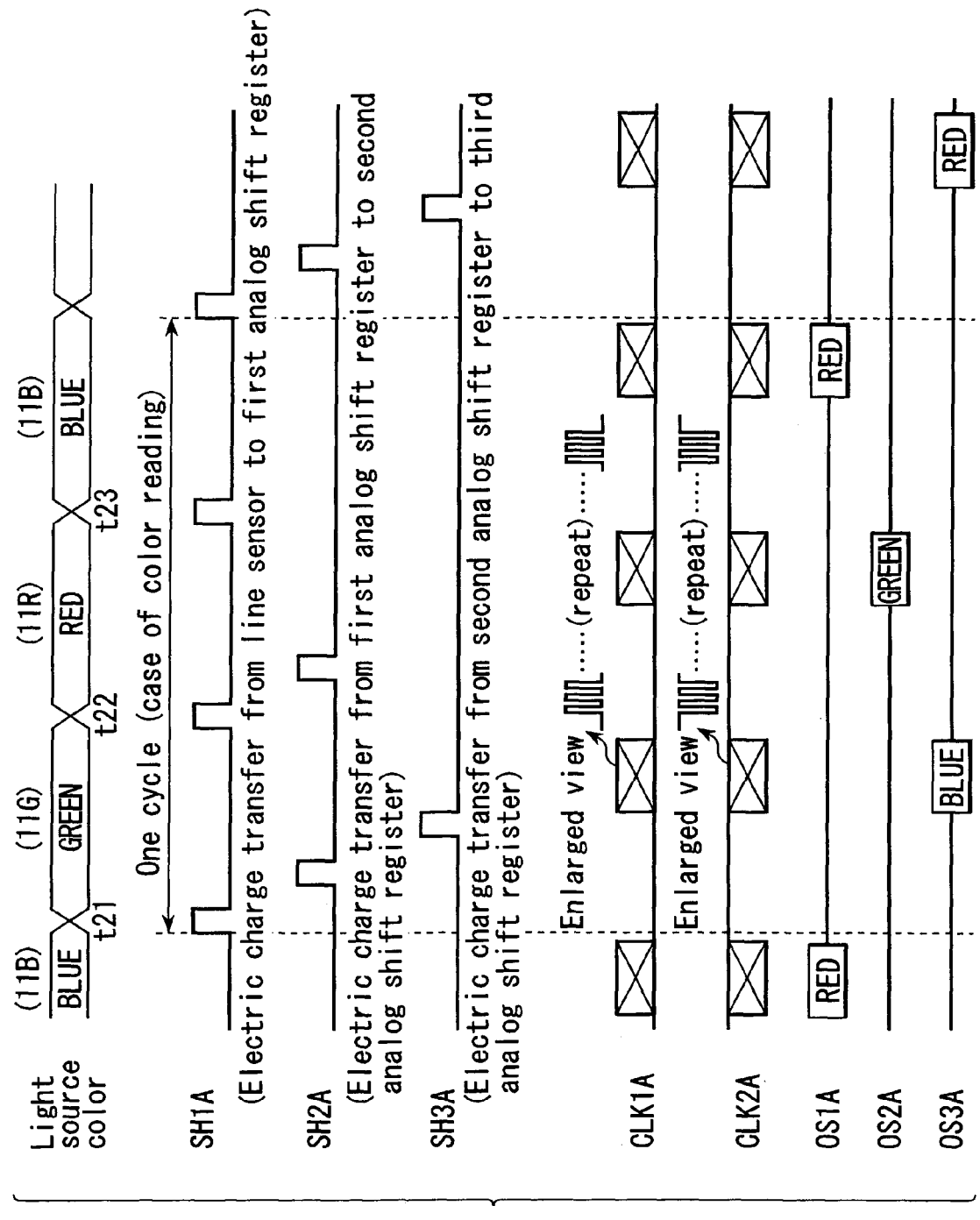
FIG. 8B is an operational timing chart of the CCD line sensor 6 relating to another embodiment of the present invention.

FIG. 8A is a schematic structural view of a CCD line sensor 6A, and FIG. 8B is a chart for explaining timings.

The CCD line sensor 6A is configured by a line sensor 6A1 formed of a photodiode array, a first analog shift register 6A3, a first shift gate 6A2, a first output amplifier 6A4, a second analog shift register 6A6, a second shift gate 6A5, a second output amplifier 6A7, a third analog shift register 6A9, a third shift gate 6A8 and a third output amplifier 6A10. The first shift gate 6A2 serves as a gate for transferring electric charges obtained by the photoelectric conversion function of the line sensor 6A1 to the first analog shift register 6A3. The first output amplifier 6A4 successively amplifies the electric charges in the first analog shift register 6A3 to output them outside. The second shift gate 6A5 is used to further transfer the electric charges transferred to the first analog shift register 6A3 to the second analog shift register 6A6. The second output amplifier 6A7 successively amplifies the electric charges in the second analog shift register 6A6 to output them outside. The third shift gate 6A8 is used to further transfer the electric charges transferred to the second analog shift register 6A6 to the third analog shift register 6A9. The third output amplifier 6A10 successively amplifies the electric charges in the third analog shift register 6A9 to output them outside.

Figure 9B:
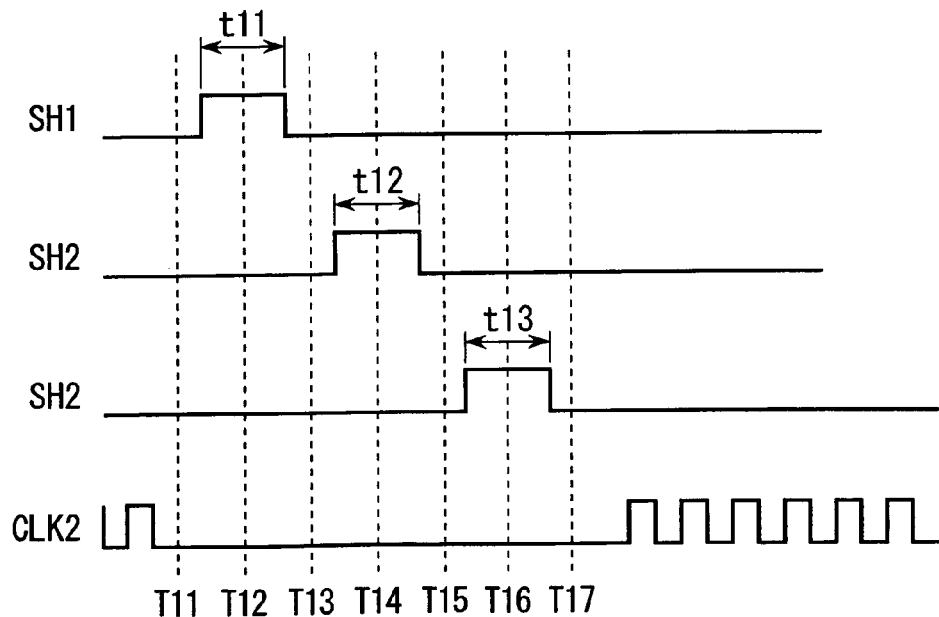
FIG. 9B is an operational timing chart of the CCD line sensor 6A shown in FIG. 8A.
Figure 9A:
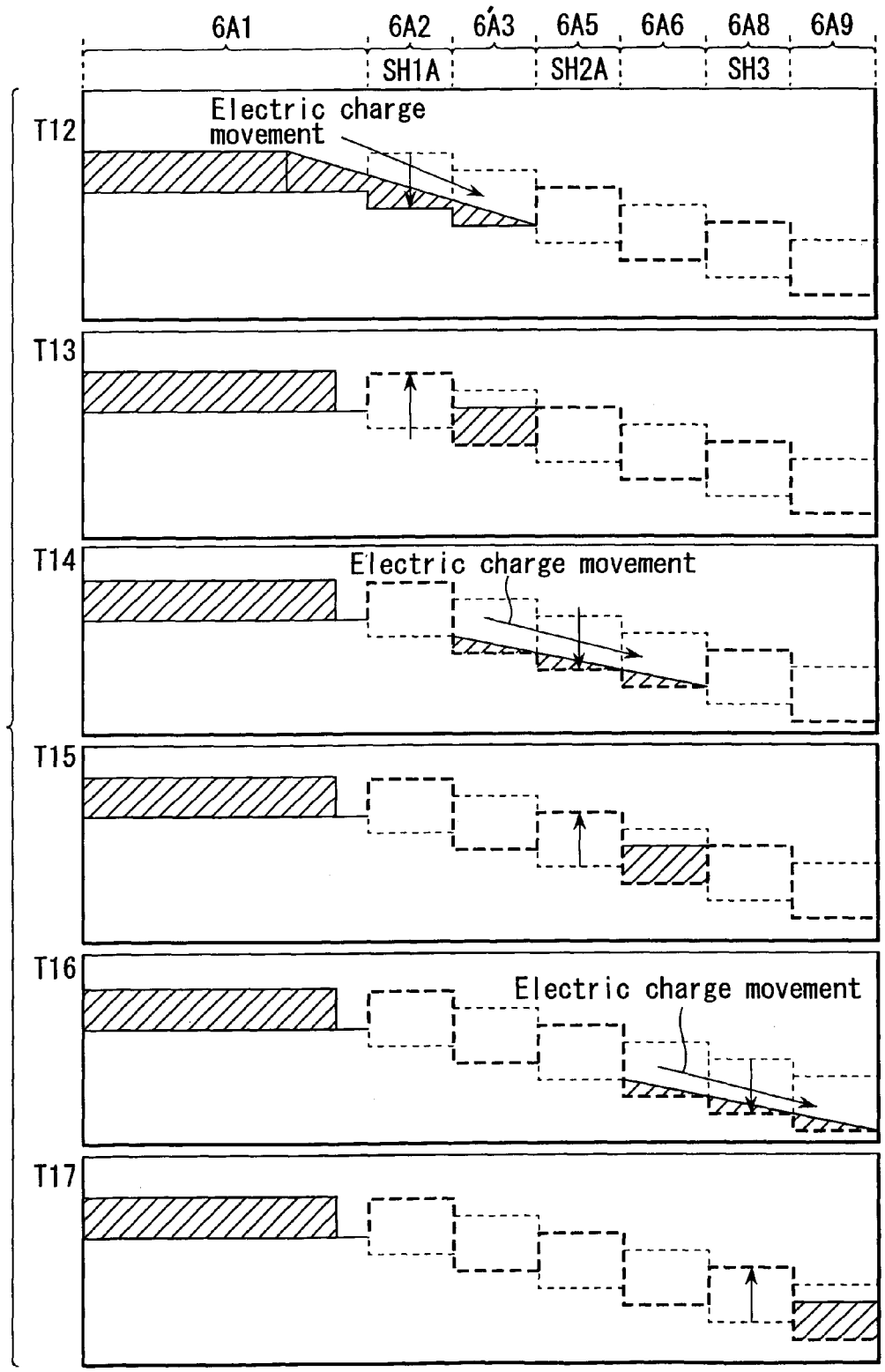
FIG. 9A is a chart for explaining the internal operation of the CCD line sensor 6A shown in FIG. 8A.

FIGS. 9A and 9B are views for explaining the internal operation of this embodiment.

When an optical energy (hv) is irradiated onto the line sensor 6A1 (photodiode), the optical energy is made into an electric charge by the photoelectric conversion function. The electric charge is accumulated in the line sensor 6A1. A drive signal SH1A applied to the first shift gate 6A2 is at an "L" level, and the gate remains ascended (the state of T11 in FIG. 9B).

When the signal SH1A is at a "H" level, the first shift gate 6A2 is descended, and the electric charge in the line sensor 6A1 is passed through the first shift gate 6A2 and transferred to the first analog shift register 6A3 (the state of T12 in FIGS. 9A and 9B). The signal SH1A remains in the "H" level for a sufficient time (t1), so that all electric charges in the line sensor 6A1 are transferred to the first analog shift register 6A3. Then, the level of the signal SH1A is switched to "L" (the state of T13).

When the level of a signal SH2A is switched from the "L" level to the "H" level, the second shift gate 6A5 is descended, the electric charge transferred to the first analog shift register 6A3 is passed through the second shift gate 6A5 and transferred to the second analog shift register 6A6 (the state of T14). After the time (t2) during which all electric charges in the first analog shift register 6A3 are transferred to the second analog shift register 6A6 passes, the level of the signal SH2A is returned to the "L" level (the state of T15).

When the level of a signal SH3A is switched from the "L" level to the "H" level, the third shift gate 6A8 is descended, the electric charge transferred to the second analog shift register 6A6 is passed through the third shift gate 6A8 and transferred to the third analog shift register 6A9 (the state of T16). After the time (t3) during which all electric charges in the second analog shift register 6A6 are transferred to the third analog shift register 6A9 passes, the level of the signal SH3A is returned to the "L" level (the state of T17).

FIG. 8B illustrates timings for switching the light source 11 (the light sources 11R, 11G and 11B) in the case in which the CCD line sensor 6A with the structure of the present invention is applied to a light source switching color image inputting apparatus. On-off controls of the light sources 11R, 11G and 11B are performed by the light source control section 106. Signals SH1A, SH2A and SH3A are generated by the CCD control section 103.

The light source 11B is lit at a timing shown in FIG. 8B. A control signal (shift pulse) SH1A is applied to the first shift gate 6A2. Then, an image signal (B) from the light source 11B is transferred to the first analog shift register 6A3(R). The level of the control signal SH1A is switched to the "H" level at t21, and during the "H" level time duration for the signal SH1A, the light source 11B is switched off and the light source 11G is lit. Subsequently, a control signal SH2A is applied to the second shift gate 6A5 and thus electric charges transferred to the first analog shift register 6A3(R) are transferred to the second analog shift register 6A6(G). Further, a control signal SH3A is applied to the third shift gate 6A8 and thus the electric charges transferred to the second analog shift register 6A6(G) are transferred to the third analog shift register 6A9(B). By such control, all image signals (B) read by the light source 11B are transferred to the third analog shift register 6A9(B).

Then, the control signal SH1A is applied to the first shift gate 6A2 at the time t22. An image signal (G) from the light source 11G is transferred to the first analog shift register 6A3(R). During the "H" level time duration of the control signal SH1A, the light source 11G is switched off and the light source 11R is lit. Subsequently, the "H" level control signal SH2A is applied to the second shift gate 6A5, so that all electric charges transferred to the first analog shift register 6A3(R) are transferred to the second analog shift register 6A6(G). By such control, all image signals (G) read by the light source 11G are transferred to the second analog shift register 6A6(G).

The "H" level control signal SH1A is applied to the first shift gate 6A2 at the time t23, an image signal (R) from the light source 11R is transferred to the first analog shift register 6A3(R). During the control signal SH1A being at the "H" level, the light source 11G is switched off, and the light source 11B is lit.

Described above is a one cycle operation. By such operation, a RED image signal is transferred to the first analog shift register 6A3. A GREEN image signal is transferred to the second analog shift register 6A6. A BLUE image signal is transferred to the third analog shift register 6A9. One cycle requires about 1 mS, for example. During this cycle, color information corresponding to one line of a document is sampled.

Electric charges transferred to the respective analog shift registers are successively outputted from the output amplifiers 6A4, 6A7 and 6A10 to the image processing section 105 of the CCD line sensor 6A by transfer clocks CLK1A and CLK2A.

Although a switch on-off control is performed upon the light sources 11B, 11G and 11R in this order in the light source 11 in accordance with the above description, this order may be changed. If the order is changed, information about colors of signals outputted from the output amplifiers is changed.

Figure 10:
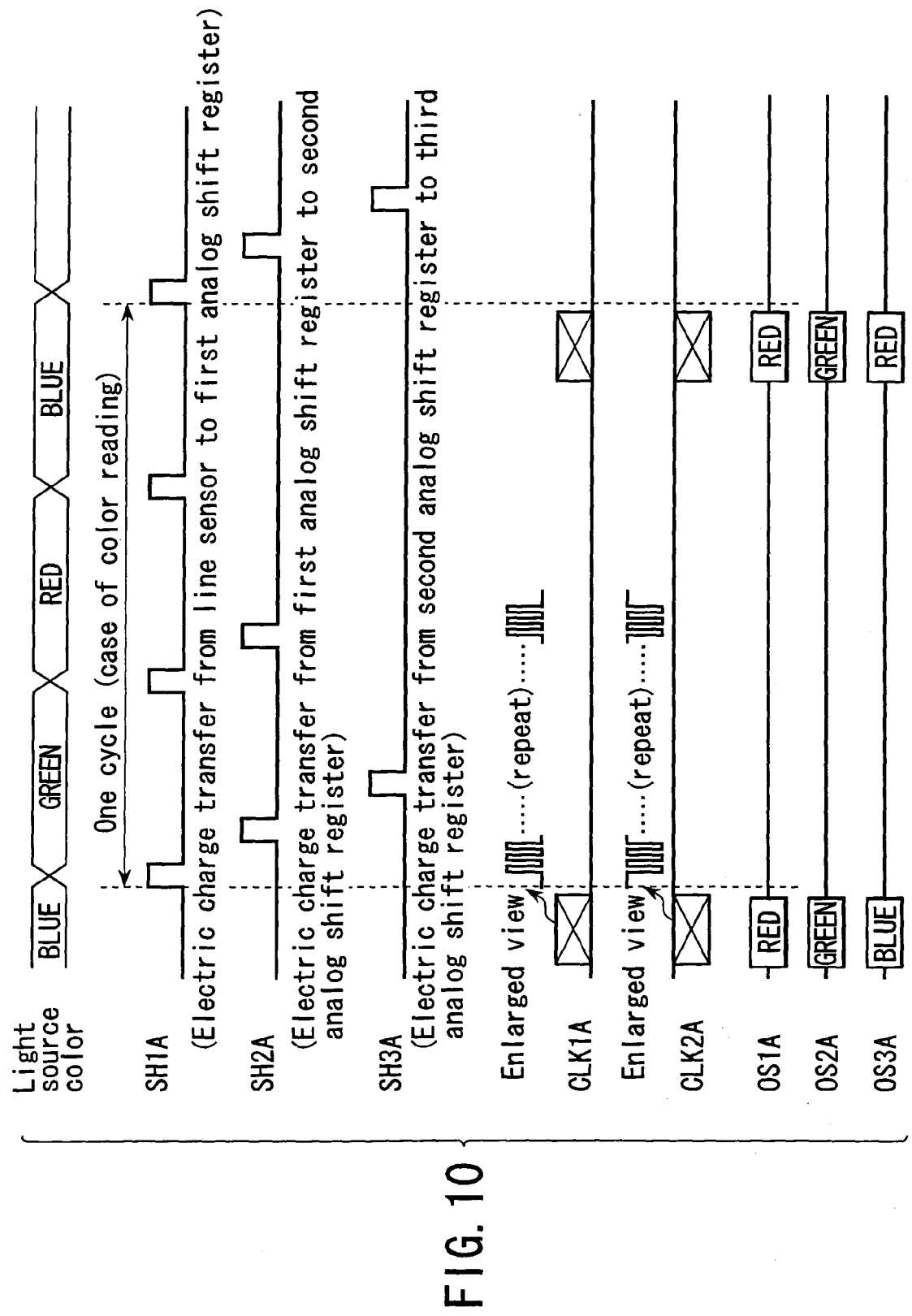
FIG. 10 is another operational timing chart of the CCD line sensor 6A.

When the transfer clocks CLK1 and CLK2 are applied at timings shown in FIG. 8B, image information of each color is outputted with its time axis being shifted, as shown in FIG. 8B. In contrast, as shown in FIG. 10, when the transfer clocks CLK1A and CLK1B are inputted only after the third control signal SH1A is applied during one cycle operation, image information of each color can be simultaneously outputted.

Next, other embodiment of the present invention will be described. In accordance with this embodiment, the CCD line sensor 6A is applied to a monochrome reading operation. Because the CCD line sensor 6A has the same structure as in FIG. 8A, illustration thereof will be omitted.

Figure 11:
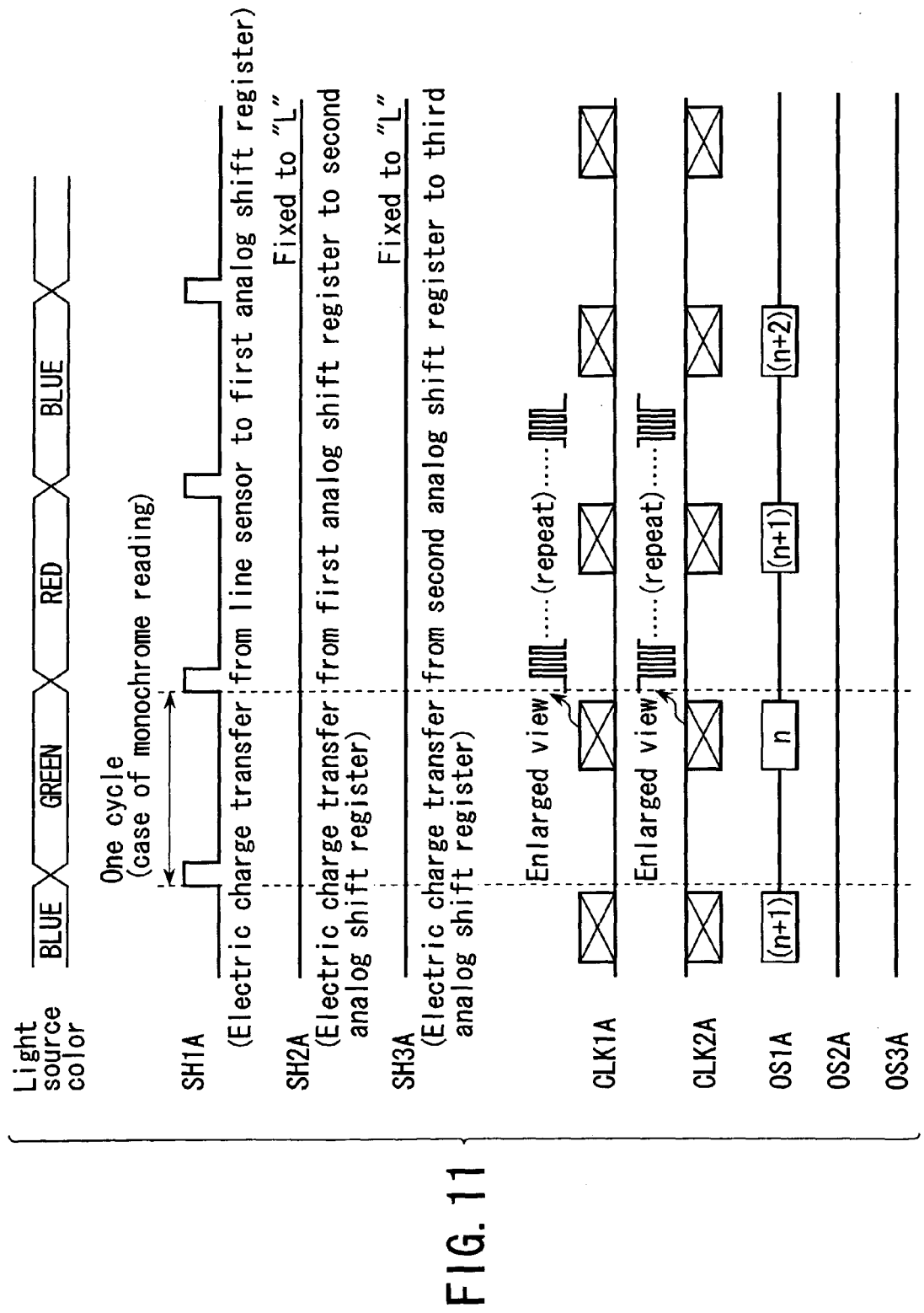
FIG. 11 is another operational timing chart of the CCD line sensor 6A.

In accordance with this embodiment, as shown in FIG. 11, the CCD control section 103 supplies only the control signal SH1A to the CCD line sensor 6A. Levels of the control signals SH2A and SH3A are fixed to the "L" level. Accordingly, only an output signal from the first output amplifier 6A4 subsequent to the first analog shift register 6A3 is outputted to the image processing section 105.

In the case of reading performed while only the light source 11R, 11G or 11B is lit, a read document is a monochrome or of a single color. Problems are not presented about reading of a monochrome document formed of black and white images.

By simultaneously switching on the light sources 11R, 11G and 11B, a problem in which a document may be hardly read depending on colors constituting the document is solved. Further, as the amount of light entering the CCD line sensor 6A is increased, a reading speed can be increased.

Figure 12:
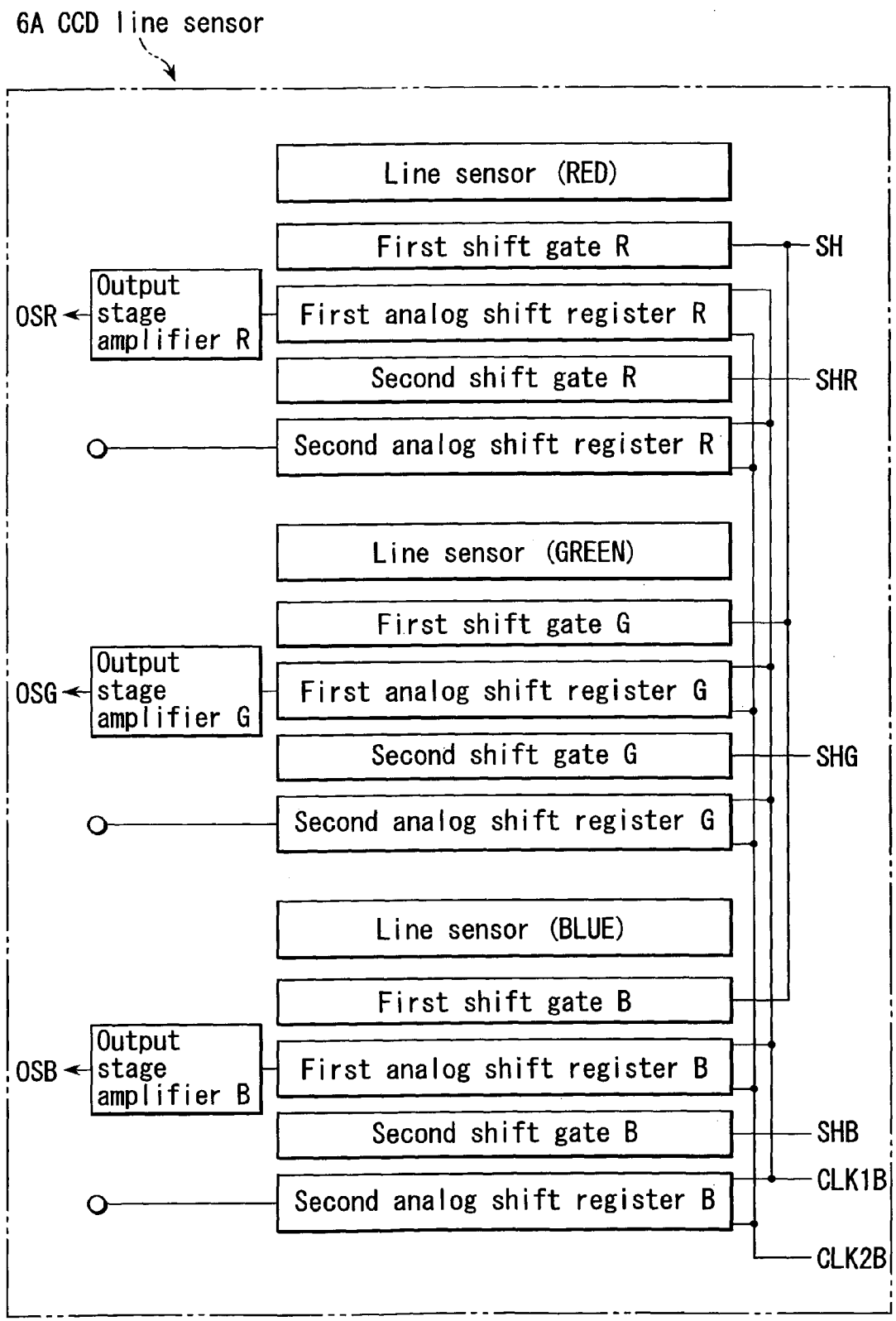
FIG. 12 is a schematic structural view of an embodiment in which the present invention is applied to a 3-line CCD sensor.

FIG. 12 illustrates a structural example of an embodiment in which the present invention is applied to a 3-line CCD sensor. FIG. 12 is different from FIG. 3A in that R, G and B line sensors are provided, and first and second shift gates, first and second output stage amplifiers and first and second analog shift registers are provided for each of the line sensors.

In the 3-line CCD sensor, R, G and B color filters are placed on light receiving surfaces of the CCD line sensors.

The output voltage of the CCD line sensor is indicated by the product of spectral distribution characteristics of a light source and spectral sensitivity characteristics of the CCD line sensor. By selecting a light source and a CCD line sensor which is suitable for characteristics of the light source, output voltages of the respective colors of the CCD line sensor when a reference document, e.g., the white reference plate 19 shown in FIG. 1 is read can coincide with each other. For example, by adjusting amounts of R, G and B fluorescents in a light source, output voltages of R, G and B CCD line sensors can coincide with each other. As described in the prior art, however, spectral sensitivity characteristics of a CCD line sensor, spectral distribution characteristics of a light source and a light amount of the light source may vary widely for each device. Thus, it is difficult to select a light source and a CCD line sensor which is suitable for characteristics of the light source.

In accordance with this embodiment, the CCD driver 103 changes pulse widths of an electric charge transfer signal SHR (shift pulse) to a second RED analog shift register R, an electric charge transfer signal SHG to a second GREEN analog shift register G and an electric charge transfer signal SHB to a second BLUE analog shift register B depending on sensitivities of the line sensors. Thus, amounts of electric charges on a first RED analog shift register R, a first GREEN analog shift register G and a first BLUE analog shift register are adjusted. In this way, signal amplitudes of a RED output (OSR), a GREEN output (OSG) and a BLUE output (OSB) can be easily matched.

Although the RED line sensor, the GREEN line sensor and the BLUE line sensor are arranged in this order in FIG. 12, the line sensors are not necessarily placed in this order.

Figure 13:
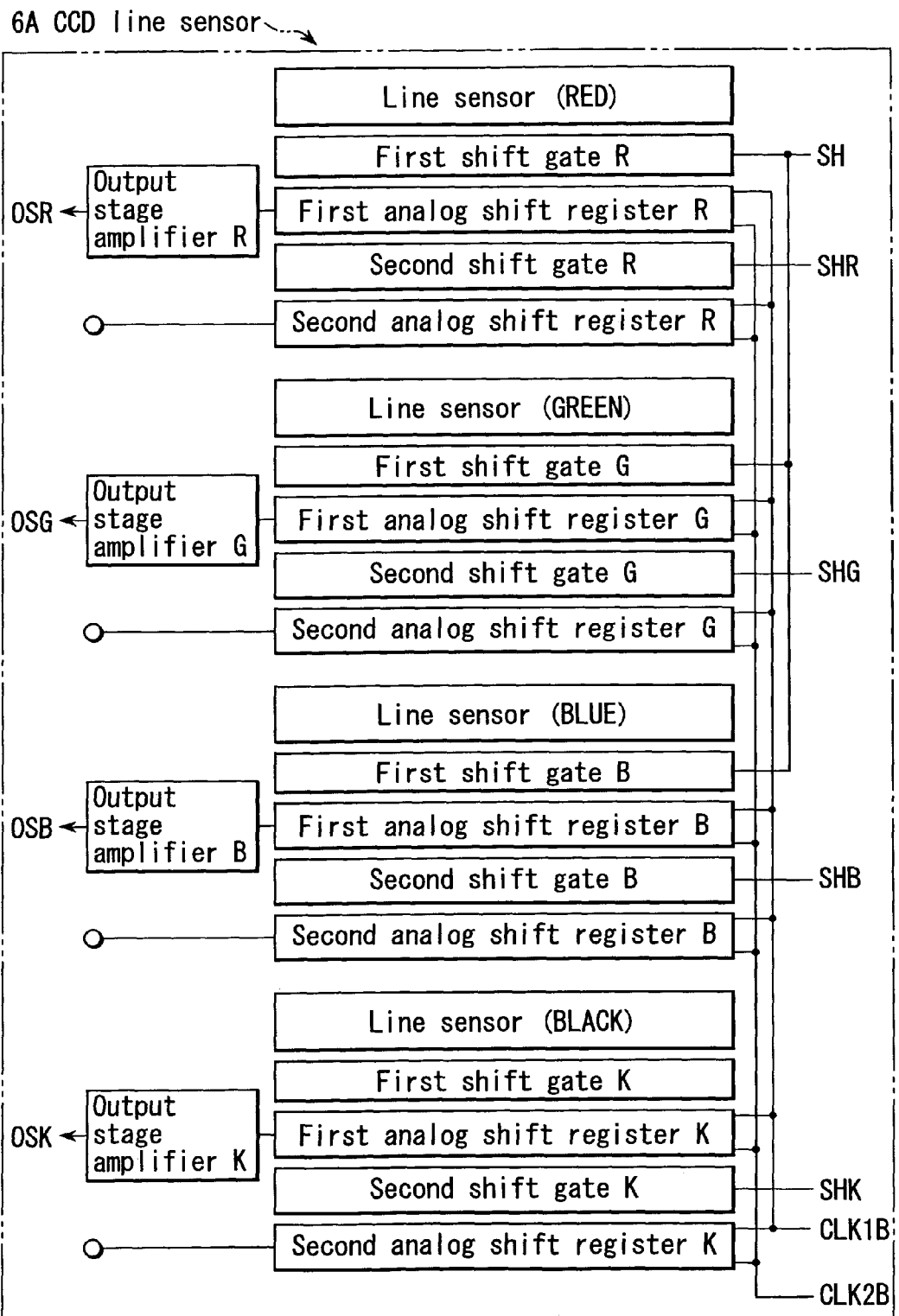
FIG. 13 is a schematic structural view of an embodiment in which the present invention is applied to a 4-line CCD sensor.

FIG. 13 illustrates a structural view of an example in which the present invention is applied to a 4-line CCD sensor. Referring to FIG. 13, a BLACK line sensor is added to the 3-line CCD sensor shown in FIG. 12. Further, first and second shift gates K, first and second output stage amplifiers K and first and second analog shift registers K are provided for the BLACK line sensor.

As described above, by combining a light source with a CCD line sensor, output voltages of the respective colors of the CCD line sensor when a reference document, e.g., the white reference plate 19 shown in FIG. 1 is read can coincide with each other. Nevertheless, devices vary widely, and thus it is difficult to select a light source and a CCD line sensor which is suitable for characteristics of the light source.

In accordance with this embodiment also, the CPU driver 103 changes pulse widths of an electric charge transfer signal SHR to a second RED analog shift register R, an electric charge transfer signal SHG to a second GREEN analog shift register G and an electric charge transfer signal SHB to a second BLUE analog shift register B depending on sensitivities of the line sensors.

Color filters are placed on light receiving surfaces of the line sensors. Instead of such color filters, a colorless transparent protective plate is placed on the light receiving surface of the line sensor BLACK in the 4-line CCD sensor. Thus, the sensitivity of the line sensor BLACK is larger than those of the other CCD line sensors. In the 4-line CCD sensor, if the light receiving surfaces of the line CCD sensors have the same size, the amplitude of a BLACK output (OSK) tends to be larger than those of other signals.

Accordingly, in this embodiment, the CCD control section 103 sets the pulse width of a control signal at the second BLACK shift gate K to be shorter than those of other control signals. Thus, the amplitude of the BLACK output signal OSK can be easily made to be the same as those of other output signals OSR, OSG and OSB. Although the RED line sensor, the GREEN line sensor, the BLUE line sensor and the BLACK line sensor are arranged in this order in FIG. 13, the line sensors are not necessarily placed in this order.

Described above are examples in which the present invention is applied to one dimensional CCD sensors. Nevertheless, it is apparent that the subject of the present invention may be also applied to two-dimensional CCD sensors.

What is claimed is:

1. An image inputting apparatus comprising:
   a line sensor in which a plurality of photoelectric conversion elements are arranged on a line and which receives light and accumulates electric charges corresponding to a document image;
   a first shift gate for transferring the electric charges accumulated in the line sensor;
   a first analog shift register which shifts the electric charges transferred from the line sensor via the first shift gate in a main-scanning direction depending on a shift clock so as to provide a shifted image signal;
   a second shift gate for transferring the electric charges in the first analog shift register;
   a second analog shift register which shifts the electric charges transferred from the first analog shift register via the second shift gate in the main-scanning direction depending on the shift clock so as to provide a shifted image signal; and an adjustment section which adjusts the amount of the electric charges on the first analog shift register by adjusting the electric charge transfer time of the second shift gate.

2. The image inputting apparatus according to claim 1, wherein the adjustment section adjusts the electric charge transfer time of the second shift gate by the number of pulses with a certain period to be supplied to the gate.

3. The image inputting apparatus according to claim 1, wherein the adjustment section adjusts the electric charge transfer time of the second shift gate by changing the effective time duration of a pulse signal to be supplied to the gate.

4. The image inputting apparatus according to claim 1, further comprising:

a first image processing section which processes the image signal provided from the first analog shift register;

a second image processing section which processes the image signal provided from the second analog shift register;

a line memory which delays the image signal processed by the first image processing section by one line; and an adding section which adds the image signal processed by the second image processing section to the image signal delayed by the line memory.

5. An image inputting apparatus comprising:

a line sensor in which a plurality of photoelectric conversion elements are arranged on a line and which receives light and accumulates electric charges corresponding to a document image;

a first shift gate for transferring the electric charges accumulated in the line sensor;

a first analog shift register which shifts the electric charges transferred from the line sensor via the first shift gate in a main-scanning direction depending on a shift clock so as to provide a shifted image signal;

a second shift gate for transferring the electric charges in the first analog shift register;

a second analog shift register which shifts the electric charges transferred from the first analog shift register via the second shift gate in the main-scanning direction depending on the shift clock so as to provide a shifted image signal;

a third shift gate for transferring the electric charges in the second analog shift register;

a third analog shift register which shifts the electric charges transferred from the second analog shift register via the third shift gate in the main-scanning direction depending on the shift clock so as to provide a shifted image signal;

three light sources which have red, green and blue spectral characteristics and illuminate the document; and a light source control section which successively switches the three light sources to light them during an electric charge transfer cycle of the first shift gate.

6. The image inputting apparatus according to claim 5, wherein the light source control section performs a switch on-off control for the light sources during a period that the electric charges accumulated in the line sensor are transferred by the first shift gate.

7. An image inputting apparatus comprising:

(1) a plural-line CCD sensor in which red, green and blue color filters are placed on the light receiving surfaces, the plural-line CCD sensor comprising:

(a) a line sensor which is provided for each color and accumulates light receiving electric charges corresponding to a document image, and in which a plurality of photoelectric conversion elements are arranged on a line;

(b) a first shift gate provided for each color for transferring the electric charges accumulated in the line sensor;

(c) a first analog shift register which is provided for each color and shifts the electric charges transferred from the line sensor via the first shift gate in a main-scanning direction depending on a shift clock so as to provide a shifted image signal;

(d) a second shift gate provided for each color for transferring the electric charges in the first analog shift register; and (e) a second analog shift register which is provided for each color and shifts the electric charges transferred from the first analog shift register via the second shift gate in the main-scanning direction depending on the shift clock so as to provide a shifted image signal; and (2) an adjustment section which adjusts the amount of the electric charges on the first analog shift register by adjusting the electric charge transfer time of the second shift gate.

8. The image inputting apparatus according to claim 7, wherein the adjustment section adjusts the electric charge transfer time of each second shift gate so that amounts of the electric charges in the first analog shift registers for the CCD sensors coincide with each other when the line sensors read white.

9. The image inputting apparatus according to claim 8, wherein the adjustment section adjusts the electric charge transfer time of the second shift gate by the number of pulses with a certain period to be supplied to the gate.

10. The image inputting apparatus according to claim 8, wherein the adjustment section adjusts the electric charge transfer time of the second shift gate by changing the effective time duration of a pulse signal to be supplied to the gate.

11. The image inputting apparatus according to claim 8, wherein the plural-line CCD sensor includes a 4-line CCD sensor in which in addition to the red, green and blue color filters, a colorless transparent layer is further placed on the light receiving surface.

12. The image inputting apparatus according to claim 8, wherein the plural-line sensor is a 3-line CCD sensor.

13. An image inputting apparatus comprising:

a line sensor in which a plurality of photoelectric conversion elements are arranged on a line and which receives light and accumulates electric charges corresponding to a document image;

a first shift gate for transferring all of the electric charges accumulated in the line sensor;

a first analog shift register which shifts the electric charges transferred from the line sensor via the first shift gate in a main-scanning direction depending on a shift clock so as to provide a shifted image signal;

a second shift gate for transferring the electric charges in the first analog shift register;

a second analog shift register which shifts the electric charges transferred from the first analog shift register via the second shift gate in the main-scanning direction depending on the shift clock so as to provide a shifted image signal; and an adjustment section which adjusts an electric charge transfer amount of the second shift gate so as to remain desired electric charges on the first analog shift register.

* * * * *